(12) United States Patent
Beyer et al.

(10) Patent No.: US 11,594,741 B2
(45) Date of Patent: Feb. 28, 2023

(54) METHOD FOR PRODUCING BIPOLAR PLATES FOR FUEL CELLS

(71) Applicants: FRAUNHOFER-GESELLSCHAFT ZUR FOERDERUNG DER ANGEWANDTEN FORSCHUNG E.V., Munich (DE); TECHNISCHE UNIVERSITAET DRESDEN, Dresden (DE)

(72) Inventors: Eckhard Beyer, Dresden (DE); Teja Roch, Dresden (DE)

(73) Assignees: FRAUNHOFER-GESELLSCHAFT ZUR FOERDERUNG DER ANGEWANDTEN FORSCHUNG E.V., Munich (DE); TECHNISCHE UNIVERSITAET DRESDEN, Dresden (DE)

( * ) Notice: Subject to any disclaimer, the term of this patent is extended or adjusted under 35 U.S.C. 154(b) by 150 days.

(21) Appl. No.: 17/292,508

(22) PCT Filed: Nov. 5, 2019

(86) PCT No.: PCT/EP2019/080211
§ 371 (c)(1),
(2) Date: May 10, 2021

(87) PCT Pub. No.: WO2020/094627
PCT Pub. Date: May 14, 2020

(65) Prior Publication Data
US 2021/0399314 A1    Dec. 23, 2021

(30) Foreign Application Priority Data
Nov. 8, 2018  (DE) .................... 10 2018 219 056.9

(51) Int. Cl.
*H01M 8/0228* (2016.01)
*H01M 8/0206* (2016.01)
(Continued)

(52) U.S. Cl.
CPC ....... *H01M 8/0228* (2013.01); *H01M 8/0206* (2013.01); *H01M 8/0213* (2013.01); *H01M 8/0258* (2013.01); *H01M 8/0297* (2013.01)

(58) Field of Classification Search
CPC ............. H01M 8/0228; H01M 8/0206; H01M 8/0213; H01M 8/0258; H01M 8/0297;
(Continued)

(56) References Cited

FOREIGN PATENT DOCUMENTS

DE   10 2004 016 318   10/2005
DE   10 2008 064 085   7/2009
(Continued)

OTHER PUBLICATIONS

International Search Report.
(Continued)

*Primary Examiner* — Helen Oi K Conley
(74) *Attorney, Agent, or Firm* — Jacobson Holman PLLC

(57) ABSTRACT

A method for producing bipolar plates for fuel cells, one metal strip or two metal strips is/are guided through a second or third device. The second device is designed to carry out fine cleaning and/or nitriding of the metal strip, and the third device carries out surface coating on one side of a surface with a metal layer that improves adhesion. Applying a carbon layer in a fourth device. The metal strips are then shaped, during which process channels are formed. The shaped metal strips are moved and positioned such that surface regions come into contact with one another. Joining is performed with a laser beam, which is directed into a gap between the shaped metal strips moved towards one another.

(Continued)

The individual steps in the devices, like shaping and joining, are carried out in a continuous process.

16 Claims, 2 Drawing Sheets

(51) Int. Cl.
*H01M 8/0213* (2016.01)
*H01M 8/0258* (2016.01)
*H01M 8/0297* (2016.01)

(58) Field of Classification Search
CPC ..... H01M 2008/1095; H01M 2250/20; H01M 2250/30; Y02E 60/50; C23C 8/36; C23C 14/16; C23C 14/325
See application file for complete search history.

(56) References Cited

FOREIGN PATENT DOCUMENTS

| | | |
|---|---|---|
| DE | 10 2011 017 417 | 10/2011 |
| DE | 10 2017 205 523 | 4/2018 |
| DE | 10 2016 125 502 | 6/2018 |
| DE | 10 2017 202 679 | 8/2018 |

OTHER PUBLICATIONS

German Examination Report.
Taherian Reza. "A review of composite and metallic bipolar plates in proton exchange membrane fuel cell: Materials, fabrication, and material selection", Journal of Power Sources, Elsevier SA, CH, vol. 265, May 29, 2014 (May 29, 2014), pp. 370-390 DOI: 10.1016/J.JPOWSOUR.2014.04.081; ISSN: 0378-7753. XP028851118.

METHOD FOR PRODUCING BIPOLAR PLATES FOR FUEL CELLS

BACKGROUND OF THE INVENTION

The invention relates to a method for the production of bipolar plates for fuel cells, in particular fuel cells in which a bipolar plate is arranged on one side of at least one of the two electrodes of fuel cells and can be connected to a membrane-electrode arrangement, the membrane forming an electrolyte being a polymer membrane.

Fuel cells are used, for example, to generate electricity in mobile applications by converting chemical energy into electrical energy. At present, the production of fuel cells is still expensive, so that their application in the automotive sector, for example, cannot yet be implemented economically. Bipolar plates (BIP) are used in fuel cells for the supply of hydrogen, oxygen and the discharge of water, cooling water as well as the supply and tapping of released electrons. An anode (hydrogen supply) and a cathode (oxygen supply and water removal) are arranged between two bipolar plates, between which a polymer membrane (Polymer Electrolyte Membrane—PEM) with an electrode coating or catalyst layers containing, for example, platinum as a catalyst and the gas diffusion layer are arranged. They form a so-called membrane electrode assembly (MEA). In addition, appropriate seals are applied to the bipolar plate. This typically occurs before the MEA is installed. The PEM is an electrically insulating but proton-conducting polymer membrane. This allows hydrogen ions to diffuse through and electrical current can be conducted to the cathode via a load. The electrode layers are typically hot pressed onto the PEM. Between the bipolar plates and the membrane/electrode, there are so-called gas diffusion layers (GDL), a fabric made up of, for example, carbon fibers, which has the purpose of evenly distributing the gases escaping from the channels of the BiP over the entire surface of the membrane and of passing on the electrons emitted by the hydrogen to the respective bipolar plate or conducting them away from there.

The fuel cell typically achieves a voltage between the two electrodes of, for example, 0.5 V-1.23 V. Due to losses, however, the useful electrical voltage is typically lower. It is important that the released electrons are absorbed as efficiently as possible on the hydrogen side and returned to the process as efficiently as possible on the oxygen side. The contact or penetration resistances should be as low as possible. An electrical resistance at this point has a direct influence on the efficiency of the BIP. The operating temperature is maintained within an optimal range for the cell type, for example <100° C. The cooling required can be realized by a cooling circuit inside the bipolar plate.

To date, in the production of such fuel cells, a BIP half-shell is manufactured from a rolled steel or titanium sheet (thickness 0.05 mm-0.2 mm). For this purpose, the sheet metal is cut out, for example, and formed by means of a single-stage or multi-stage embossing process. This half shell is then joined with a second half shell to form a BIP. The half-shells can have different geometries on the cathode and anode sides. The joining process for BIP stainless steel is typically a laser welding process. For titanium, adhesive joining processes are also used. After joining the panels, they are surface-coated on both sides. This can be, for example, a layer system that ends with a carbon layer.

A seal is then applied to the BIP, which can be achieved using a spraying process, for example. It is then cured. Alternatively, a prefabricated seal can be applied. This is followed by the application of the MEA. By stacking such BIP+MEA, fuel cells or fuel cell stacks are formed. In some cases, there are still intermediate steps in the method described, e.g. for quality assurance. This test also includes testing the tightness of individual cells or, finally, of the entire cell stack.

SUMMARY OF THE INVENTION

It is therefore the object of the invention to provide ways of increasing labor productivity in the production of bipolar plates for fuel cells.

According to the invention, this task is solved with a method having the features of the claims.

One improvement is the approach to producing fuel cells, in which the entire production process can be carried out in one process chain or in one production line. For this purpose, as many production steps as possible should be carried out in a continuous process and a separation of the strip in BIP or BIP+GDL or BIP+MEA should take place as late as possible in the process chain. This scenario is a roll-to-plate process. At the end of the process chain, an entire fuel cell stack consisting of a large number of stacked BIP+MEA and corresponding sealing technology as well as end pieces can be built up from such individual BIP.

In the method, a metal strip or two metal strips may be passed through a first device configured to pre-clean the metal strip or two metal strips when precleaning is required.

After the pre-cleaning, if required, the one metal strip or the two metal strips are passed through a second device and/or a third device. The second device is adapted to perform fine cleaning and/or nitriding of the metal strip, and the third device is adapted to perform surface coating on one side of a surface with a metal layer improving adhesion.

A carbon layer is applied to the surface thus treated in a fourth device.

Subsequently, during the feed movement of one of the metal strips pretreated in this way, a preferably central separation in the feed axis direction and rotation of one of the separated metal strips by 180° can be carried out.

If two metal strips are used and pretreated in this way, it may be necessary to rotate one of the two metal strips pretreated in this way by 180°.

Again, following the separation and/or rotation, if required, or directly following the formation of the carbon layer, a metal strip shaping operation is carried out in which channels are formed for the supply of fuel and oxidant and the removal of reaction products of the electrochemical reactions. These shaped strips are thus no longer planar, but have a three-dimensional surface structure with elevations and/or depressions. Channel widths in the range of, for example, 0.1 mm-2 mm and channel depths of 0.05-1.5 mm can be achieved. Strips formed in this way can also have openings and thus no closed surface, for example in the area of the channel structure. The channel structure can also be a lattice structure.

The shaped metal strips are moved towards each other and positioned in such a way that surface regions in which an integral bond is to be made come into direct contact with each other and the bond is formed with at least one laser beam which is directed into a gap between the shaped metal strips moved towards each other and a welded joint is formed only there. This welding process can also be combined with a welding process in which, from the direction of one of the metal strips, this strip and the second metal strip are joined together in the form of a welded joint.

The individual steps of pre-treatment in the devices, separation and rotation if necessary, as well as shaping and joining should be carried out one after the other in a continuous throughput process.

Before a metal strip is coated, it should be cleaned, as there may still be oil residues on the metal strip from the rolling process. Cleaning can generally be carried out using wet chemical processes.

If there are only very thin films of oil on the surface, cleaning can also take the form of carbonizing the remaining oil and simultaneously preheating the strip. The temperatures for this are, for example, around 150° C. For example, hydrocarbon compounds can be oxidized during heat treatment and then the oxidation products removed.

If the metal strip has already been cleaned or is oil-free, pre-cleaning may not be necessary.

After pre-cleaning and simultaneous preheating of the one metal strip or the two metal strips, nitriding and/or plasma fine cleaning is carried out on the surfaces. For this purpose, the metal strip or the two metal strips should be heated to temperatures of 320° C.-450° C. The plasma fine cleaning can be carried out advantageously in combination with a nitration, whereby a plasma fine cleaning can be carried out first before nitrogen is added for a nitration. If plasma fine cleaning is not used in combination with nitration, the nitration depth that can be achieved per time could be reduced.

Plasma nitriding is a thermochemical treatment of the surface of steels in particular with e.g. nitrogen and is normally used to improve wear properties. At low nitriding temperatures, however, corrosion resistance can also be improved. The long nitriding times required are particularly critical for achieving large nitriding depths. However, these are not necessary in the invention.

Short nitriding times with correspondingly reduced nitriding depths of a few μm, for example, are, however, also sufficient for purely improving the adhesion of a subsequent carbon coating and creating a nitriding area close to the edge. Alternatively, nitriding may be omitted and replaced by, for example, a sputtering process or other coating process. Such a sputtering process can be carried out as metal ion sputtering, for example by generating chromium ions by means of an arc process and accelerating them onto the surface to be coated. In this way, a chromium layer can be formed which improves adhesion and corrosion protection.

Subsequently and as the last coating process, a carbon layer with a layer thickness <200 nm but preferably <50 nm is applied to the metal strip or the two metal strips in the fourth device. Here, the metal strip or strips should be kept at a temperature T>300° C. and the carbon ions should be implanted into surfaces of the metal strip or strips.

After the coating process, the one metal strip is separated into at least two metal strips, one of which becomes the anode side of the BIP and the other the cathode side of the respective BIP. One of the metal strips obtained by the separation is then rotated by 180°. Alternatively, the two metal strips can be split before coating and coated in the same or in two different lines. In this case, there is no tape separation. Since the coating of the two metal strips typically takes place from below, one of these two metal strips, from which a BIP half-shell is formed, should be rotated by 180° before the shaping process. This can also take place inline. Preferably, the pretreatment of two metal strips is carried out in such a way that the two metal strips are moved in parallel alignment to each other and at the same speed through the devices and a device for rotating one of two metal strips, and preferably this speed should also be maintained during the shaping and a joining to be carried out thereafter.

Alternatively, the strip can also be guided vertically during coating. In this case, a metal strip could be coated on both sides, for example, or the two sides of the metal strip on the front and back could be coated in different areas, so that it is not necessary to rotate the metal strip by 180° before forming or joining.

The shaping process of the metal strips can be realized by various known methods such as deep drawing, roll stamping, embossing, punching or active-media-based forming processes, for example, executed as hydroforming. For this purpose, at least one forming tool can be designed, for example, in the form of an embossing roller or an embossing die. In contrast to rolling or deep drawing, hydroforming only requires one stamping tool each, in the form of a die, for the cathode and anode sides.

In hydroforming, an active medium is fed to the side of the sheet facing the die to press the metal strip against the contour of the die; in principle, this can also be done in several stages.

For roll stamping, at least two rolls of a pair of rolls should be used, one for the cathode side and one for the anode side. A pair of rollers can consist of a male and a female die as rollers, the radially outer surface of which have been structured accordingly. For a multi-stage shaping process, several pairs of rolls can be arranged in series. The shaping process for an anode side and for a cathode side should be carried out synchronously in one strip run. The embossing structures for the cathode and anode sides are typically different.

In the case of non-continuous shaping processes and subsequent continuous further processing, for example by means of laser welding, it should be possible to provide strip accumulators, for example in the form of loops, before and after shaping, which can vary the path of the metal strip between coating or strip separation and shaping or also shaping and laser welding. This offers the advantage for all described shaping processes in the area of laser welding to be able to join the shaped metal strips with a precise fit. In this case, a precise fit means that positions of the metal strip to be joined are brought together and positioned in such a way that they come into direct contact with each other.

At least one laser beam can be used to circumferentially join the metal strips from the direction of one of the two metal strips at least in the edge region of the bipolar plate and the media supply, at their outer edges.

The shaping of the pre-treated metal strips should advantageously be carried out in such a way that areas of the metal strips to be joined with material continuity with laser radiation are either not formed or are formed in such a way that, following the forming carried out, these surface regions are positioned relative to one another during the joining in such a way that they come into direct contact with one another and converge towards one another at an angle prior to the joining, so that a gap is formed between the shaped metal strips to be joined, into which the at least one laser beam can be directed onto the surface regions to be joined. The at least one laser beam can be used to produce a tight integral bond by welding in these areas. Here, the heat input by the laser beam should be minimized in order to minimize thermal distortion of the BIP.

For a laser welding process, device rolls or also forming rolls with geometric structures can be used in each case, as they are used in the shaping process on the side that was facing the coating on the one metal strip or the two metal strips. In a multi-stage embossing process, the rollers can also be designed differently from the previously used embossing tools on their surfaces used for shaping. The device rolls should each have an elevation at positions where a weld or weld spot is to be formed.

The two device rolls may not be designed as a male and female die.

Welding on the pretreated and shaped metal strips to be joined should not cause any damage to the functional coating on the BIP. For this purpose, a weld or a spot weld should be located within a BIP. This does not reduce the corrosion-reducing effect of the coating at the welds.

If necessary, an additional circumferential weld of the bipolar plate and at positions of the material supply can be carried out subsequently as an overlapping weld. The coating can also be damaged in the process.

After joining the BIP half-shells, they can either be separated or further processed in a continuous process, preferably for the completion of complete fuel cells.

The semi-finished products can then be immediately separated in coated, shaped and integrally bonded form and subsequently processed into fuel cells.

Prior to a separation process, which may be performed using a separation process such as a laser cutting process, a sealant may also be applied and, if necessary, the materials of an MEA may be applied individually or a complete MEA may be applied to a BIP. These process steps can also be included in the manufacturing process according to the invention.

Metal strips with different thicknesses can also be used for the production. In this way, it is possible to influence the strength and the operating conditions, in particular the locally varying thermal conditions on fuel cells.

By way of example, a BIP can be produced using the individual processes described below:

The laser welding for joining the pre-treated and shaped metal strips can be carried out e.g. by means of an IR (wavelength e.g. 1000 nm-1100 nm) single mode fiber laser. Between the laser source and the surface, the laser beam can be guided via a fiber, collimated at the end of the fiber and deflected via a scanner with at least one reflective element. The scanner can be designed, for example, as a galvo scanner with two reflective elements. The laser beam can then be focused using f-theta optics. The focal width is typically 10 μm-200 μm.

In metal ion sputtering for fine cleaning in a second device, the surface of one or more at least pre-cleaned metal strips may be partially ablated by bombarding ions with sufficient energy ($10^2$ eV to several $10^3$ eV). This is based on a momentum transfer of the respective impacting ion with the surface. By means of elastic "core impacts", the impulse is introduced into the material at the surface of the respective metal strip and initiates an impact cascade. This allows surface atoms to receive outward momentum. If the kinetic energy of the incident ions is higher than the binding energy of the material atoms of the respective metal strip, they are atomized from the solid surface mainly in atomic form, but also in the form of atom clusters.

By applying an electrical high voltage in the range between 100 V and 1000 V to the respective metal strip, ideally in a vacuum chamber of a second device in the pressure range of $10^{-3}$ mbar-$10^2$ mbar, a low-pressure plasma can be generated with the aid of noble gases. With a mixture of excited metal and gas ions, the high-energy particles are accelerated towards the substrate by the applied electric current potential and ablate the surface. This may allow for the realization of a plasma fine cleaning of the substrate and increase the metal strip surface roughness.

In the case of potential-free fine cleaning, the metal ions are accelerated via additional electrodes onto the surface of a respective metal strip. Alternatively, an electrical potential can be applied to the metal ion source.

The metallization of metallic surfaces for passivation is known per se. For example, metal surfaces are galvanized or chrome-plated to protect them from corrosion in the long term. In a fuel cell, high redox potentials occur in part, depending on the driving condition, which create a very aggressive environment. If metallic BIP are used, they may corrode. The goal with a metallic BIP is to increase corrosion resistance and achieve good electrical conductivity.

Corrosion resistance can be achieved or improved by a corrosion-reducing coating or nitriding of the metal strip.

Plasma nitriding is a thermochemical treatment of the surface of steels, with e.g. nitrogen at temperatures of approx. <550° C. It is normally used to improve the wear properties. Especially in stainless steels, the passivating effect of chromium is lost due to the bonding of chromium to chromium nitride (CrN). The corrosion resistance is thus reduced. By plasma nitriding at lower temperatures <420° C., the formation of CrN can largely be avoided and corrosion resistance may even be improved. The introduction of nitrogen atoms into the near-surface region of the metal strips leads to a lattice expansion of the cubic austenitic atomic structure. For this purpose, the nitrogen is ionized in a vacuum nitrogen atmosphere at pressures of approx. 0.1 Pa and accelerated towards the metal strip.

The improvement in electrical conductivity can be achieved by depositing a carbon-based graphite-like layer system in a fourth device.

By deposition using a non-pulsed or pulsed carbon ion source, such as an arc evaporation of a carbon target in a vacuum chamber, electrically conductive, corrosion resistant coatings can be deposited. With a simultaneous increase of especially the temperature during carbon deposition, less metastable $sp^3$ bonds and more $sp^2$ bonds of carbon are formed in the layer. The generated carbon ions should be accelerated to high average ion energies >100 eV, ideally approx. 300 eV, via a potential difference (>400 V) between metal strip and carbon evaporator or accelerated via auxiliary electrodes, in order to achieve implantation of the carbon ions.

Carburizing, by means of subsequent introduction of carbon, can increase not only corrosion resistance but also electrical conductivity. The material of the metal strips used to make the BIPs can thus have a lower electrical contact resistance. At pressures in the range of 0.01 Pa-10 Pa, surface modification is achieved by ionized gas or plasma. For plasma generation, an electrical voltage of several hundred volts can be applied in a vacuum between a cathode and an anode in a second device or in a further device arranged upstream of the fourth device in the feed direction of the respective metal strip. Depending on the electrical conductivity of at least one carbon-containing gas used, a certain electrical current density results when an electrical voltage is applied.

By means of auxiliary anodes, the free electrons released by an electron source by means of arc discharge experience an additional acceleration and an intensification of the plasma can be achieved. Carbon-containing gases may preferably be carbon dioxide, methane, propane or carbon containing gas mixtures of, for example, hydrogen, nitrogen and carbon monoxide.

Carburizing can prevent a reduction in corrosion protection in the area of the laser weld.

In the method according to the invention, surfaces of a metal strip or two metal strips may also be carbonitrided.

Strip handling can be simplified by the strip process and the use of rollers to hold the metal strips in place during joining.

The heat input through joining and thus thermal distortion of the BiP can be minimized, since on the one hand the rolls can dissipate heat and on the other hand the weld seams or spots can be made finer.

By using the described solution, the metal strips with carbon coating no longer have to be coiled after coating (reduction of damage) and potential contamination can be prevented. One metal strip or both metal strips can be unwound from a roller and, if necessary, guided over deflection rollers. The feed movement can at least be supported by means of drive roller pairs. The feed motion can also be achieved by pairs of rollers alone for the aforementioned shaping.

The required process times can be minimized and contamination of materials or components due to transport can be avoided.

Fuel cells with BIPs produced according to the invention can be used in automotive, aircraft, transportation or mobile applications.

DESCRIPTION OF THE DRAWINGS

The invention is intended to be explained subsequently in more detail, by way of example.

In the drawings.

DETAILED DESCRIPTION OF THE DRAWINGS

Figure 1:
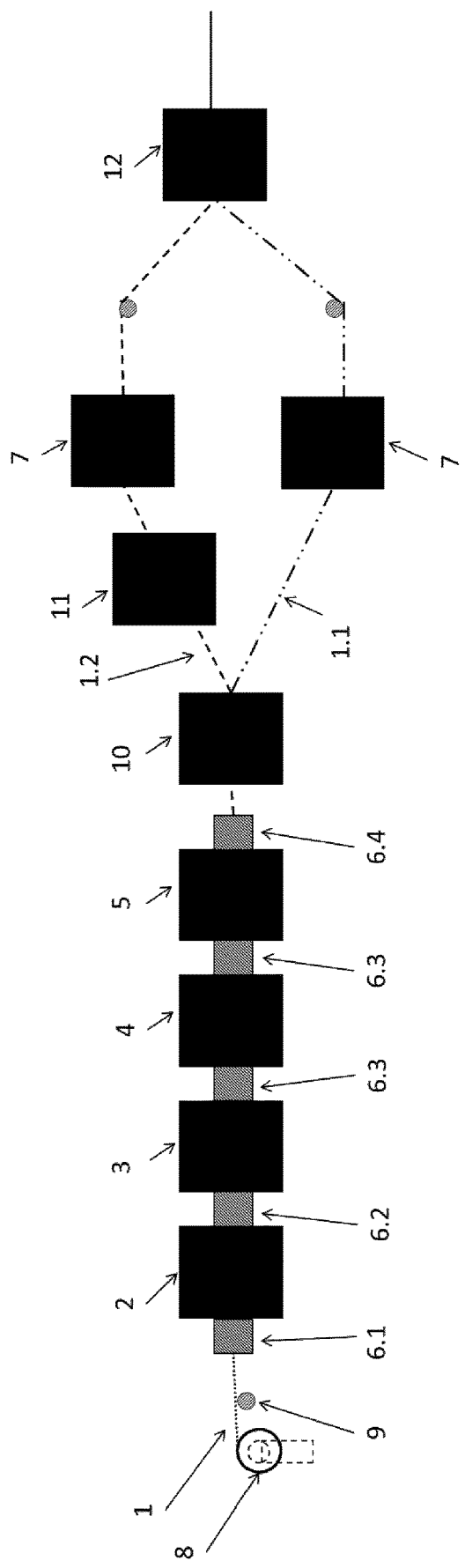
FIG. 1 schematically shows an example of the implementation of the method according to the invention and FIG. 2 shows one way of joining two pretreated metal strips.

In the example shown in FIG. 1, a metal strip 1 is unwound from a roller 8 and fed via a deflecting roller 9 into a first device 2 for carrying out a preliminary cleaning.

From there, the metal strip 1 is conveyed further into a second device 3, in which fine cleaning and nitriding is carried out by means of plasma. The metal strip 1 thus treated is then further conveyed to the third device 4, in which a chromium layer is formed to improve adhesion and provide corrosion protection on surfaces of the metal strip 1.

A carbon layer is then formed in the fourth device 5.

At least the second to fourth devices 3 to 5 should have an internal pressure that is lower than the ambient pressure and is suitable for carrying out the respective process in the respective device.

A sluice is provided between each of the devices 2 to 5, wherein the sluice 6.2 provides the transition from the first device 2 to the second device 3 in this example, with an internal pressure below ambient pressure, wherein the sluices 6.3 provide transitions between the third device 4 with reduced internal pressure and sluice 6.4 provides the transition from a fourth device 5 with reduced internal pressure in relation to the ambient atmosphere. A sluice 6.1 is also provided in front of the first device 2.

A device 10 is arranged downstream of the fourth device 5 in the feed movement direction of the metal strip 1, with which a separation of the metal strip 1 into two pretreated metal strips 1.1 and 1.2 is achieved. In this case, the metal strip 1 can be separated preferably centrally parallel to the axis of feed movement of the metal strip 1.

One of the two pretreated metal strips 1.2 thus obtained is fed to a device 11 by which it is rotated by 180°. Since usually only one surface of the metal strip is pretreated, the rotation is carried out in such a way that the pretreated surfaces of the metal strips 1.1 and 1.2 do not face each other.

In this example, each of the metal strips 1.1 and 1.2 is fed to at least one shaping device 7 and conveyed further. After shaping, the strip is no longer planar but has a wavy, typically three-dimensional surface with depressions or elevations.

The forming device can, for example, comprise embossing rollers which are structured in such a way that the metal strips 1.1 and 1.2 are deformed in such a way that depressions and, if required, also elevations, in the form of channels or mounds, can be formed for the supply and removal of operating materials and reaction products and their distribution within fuel cells. In this case, the rollers consist of pairs, one of which forms the female and one the male die.

The metal strips 1.1 and 1.2 thus shaped are fed to a device 12 for joining with material continuity, which can preferably be carried out with laser radiation.

Subsequently, a separation and further production of fuel cells can be carried out as explained in the general part of the description.

Figure 2:
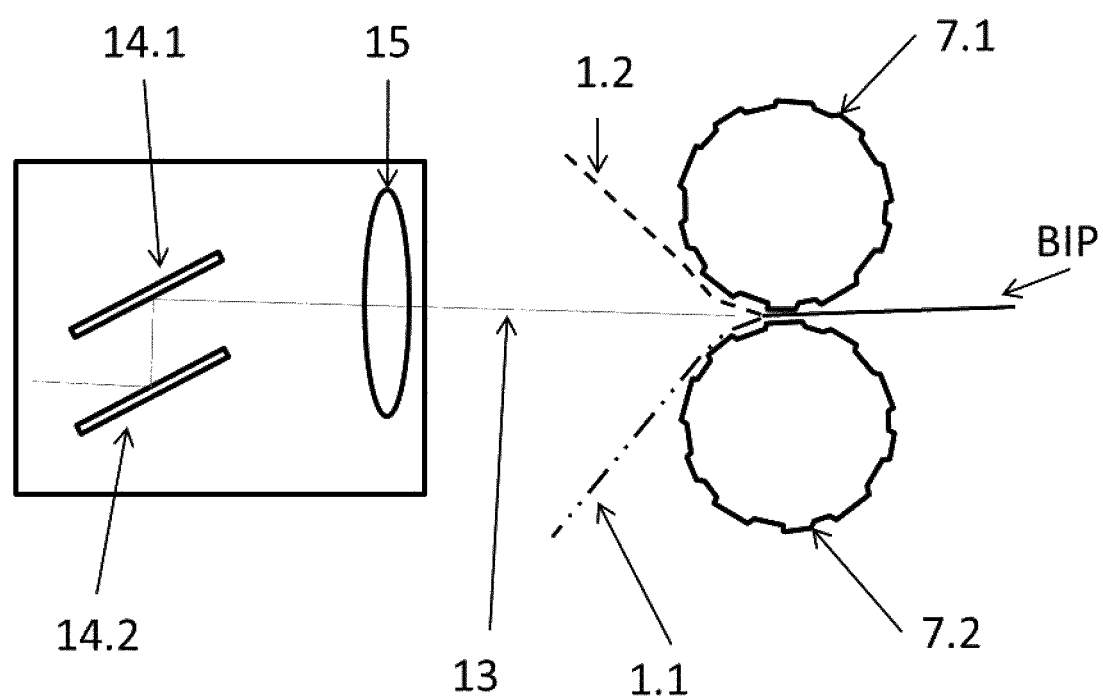

FIG. 2 shows how two metal strips 1.1 and 1.2, one of which has the anode-side channel structure and one of which has the cathode-side channel structure, which have been shaped and rotated in a suitable shape relative to each other, are moved together into the gap between the two rollers 7.1 and 7.2. When the rollers 7.1 and 7.2 rotate, they also continue to move.

If, by means of the rollers 7.1 and 7.2, surface regions of the shaped metal strips 1.1 and 1.2 are brought into direct contact with one another, at which an integral bond is to be produced, a laser beam 13 is directed into the gap between the rollers 7.1 and 7.2 onto surfaces of the pre-treated and shaped metal strips 1.1 and 1.2 which are to be directed towards one another, so that an integral welded joint is made at these positions. At these positions, surface regions of the metal strips 1.1 and 1.2 come into contact with each other. The channel structure formed between the metal strips 1.1 and 1.2 may form the cooling channels.

The laser beam 13 can be directed to the respective positions for forming the integral joints by means of two reflecting elements 14.1 and 14.2, which form a scanner or galvo scanner, and by means of which it can be deflected to the respective positions at which integral joints with material continuity are to be made. By means off-theta optics 15, the focal length and thus the position of the focal plane of the laser beam 13 can be influenced in a defined manner.

The invention claimed is:

1. A method for producing bipolar plates for fuel cells, arranging a bipolar plate on at least one side of at least one of two electrodes of fuel cells which can be electrically conductively connected to a membrane-electrode arrangement, wherein the membrane-electrode which form an electrolyte is a polymer membrane, wherein guiding one metal strip or two metal strips through a second device or a third device, wherein
the second device is designed to carry out fine cleaning or nitriding of the metal strip and
the third device is designed to carry out surface coating on one side of a surface with a metal layer that improves adhesion, and applying
a carbon layer to the surface thus treated in a fourth device, and
subsequently shaping the metal strips is carried out, in which channels are formed for the supply of fuel and oxidant and the removal of reaction products of the electrochemical reactions, wherein the then shaped metal strips are moved towards one another and positioned in such a way that surface regions in which a joining with material continuity is to be performed come into direct contact with one another, and a joint is formed with at least one laser beam which is directed into a gap between the shaped metal strips moved towards one another and a welded joint is formed only there, and during this process the individual steps of shaping and joining in the devices are carried out one after the other in a continuous process.

2. The method according to claim 1, wherein the second device, third device and fourth device are operated under reduced internal pressure relative to the environment and are separated from the environment or from one another by sluices.

3. The method according to claim 1, wherein the one metal strip or the two metal strips are guided in a conveying direction upstream of the second device or third device through a first device which is designed for precleaning the metal strip or the one or two metal strips.

4. The method according to claim 1, wherein during the feed movement of one of the metal strips thus pretreated, after formation of the carbon layer, a preferably central division in the feed axis direction and rotation of one of the divided metal strips by 180° or a 180° rotation of one of the two metal strips thus pretreated is carried out.

5. The method according to claim 1, forming the carbon layer with sp2 hybridized carbon on a surface of the one metal strip or the two metal strips by the fourth device by means of non-pulsed ion implantation at high ion energies, wherein ion energies greater than 100 eV are maintained.

6. The method according to claim 1, wherein pre-cleaning is carried out wet-chemically or by means of a heat treatment in which hydrocarbon compounds are oxidized and then the oxidation products are removed.

7. The method according to claim 1, wherein the fine cleaning or the nitriding is carried out with a plasma, wherein the metal strip(s) has/have been heated to a temperature in the range 320° C. to 450° C.

8. The method according to claim 1, wherein an adhesive layer is formed in which metal ions, are placed onto the surface to be coated by means of an electric arc process.

9. The method according to claim 1, wherein at least two shaping tools of at least one tool pair, through which the pretreated metal strips are moved and the surfaces of the tool pair facing each other are formed for shaping the pretreated metal strips, are used for shaping the pretreated metal strips.

10. The method according to claim 1, wherein the shaping of the metal strips is carried out in such a way that regions of the metal strips to be joined with material continuity with laser radiation are either not shaped or are shaped in such a way that, following the shaping, these surface regions are positioned with respect to one another during the joining in such a way that they come into direct contact with one another and, before the joining, a gap is formed between the shaped metal strips to be joined, into which gap the at least one laser beam can be directed onto the surface regions to be joined.

11. The method according to claim 10, wherein the metal strips are circumferentially joined with the at least one laser beam from the direction of one of the two metal strips and at least in the edge region of the bipolar plates and a media supply.

12. The method according to claim 1, wherein a nitration is carried out at temperatures below 450° C. in a nitrogen atmosphere in the second device for a period of time of at the most 5 minutes.

13. The method according to claim 1, wherein the one metal strip or the two metal strips made of a steel or titanium is/are used.

14. The method according to claim 1, wherein the two metal strips are moved in parallel alignment to each other and at the same speed through the devices and an apparatus for joining the metal strips, maintaining this speed also during shaping and, if necessary, during a strip turn or rotation.

15. The method according to claim 1, wherein in the second device or in a further device which is arranged upstream of the fourth device in a feed movement direction of the one metal strip or of the two metal strips, an additional carburizing is carried out by adding carbon.

16. The method according to claim 1, wherein the metal strips of different thickness are used.

* * * * *